United States Patent

Goodwin

[15] 3,665,167
[45] May 23, 1972

[54] APPARATUS FOR MONITORING DISPENSION OF LIQUID

[72] Inventor: Arthur J. Goodwin, Sepulveda, Calif.
[73] Assignee: Diversified Inventory Systems, Inc., Honolulu, Hawaii
[22] Filed: Dec. 2, 1970
[21] Appl. No.: 94,491

[52] U.S. Cl............................235/92 FL, 222/23, 235/92 R, 235/92 FP, 235/92 PE, 235/94
[51] Int. Cl...........................................................G01f 1/04
[58] Field of Search............................222/23; 235/92 FL, 94

[56] References Cited

UNITED STATES PATENTS 3,467,279 9/1969 Upton..................................235/92 FL
3,231,135 1/1966 Starbuck................................235/94

Primary Examiner—Maynard R. Wilbur
Assistant Examiner—Robert F. Gnuse
Attorney—Smyth, Roston & Pavitt

[57] ABSTRACT

Dispensing of liquid is supervised and metered in monetary units permitting distinction between regular and large quantity discount prices. Resettable counters are employed to alternate between fast money counting periods and subsequent delay, tolerance and compensating periods, operating selectively on a cyclic basis in dependence upon continued or discontinued dispensing during delay periods. The counters determine particular periods during which a tally counter is operated.

5 Claims, 1 Drawing Figure

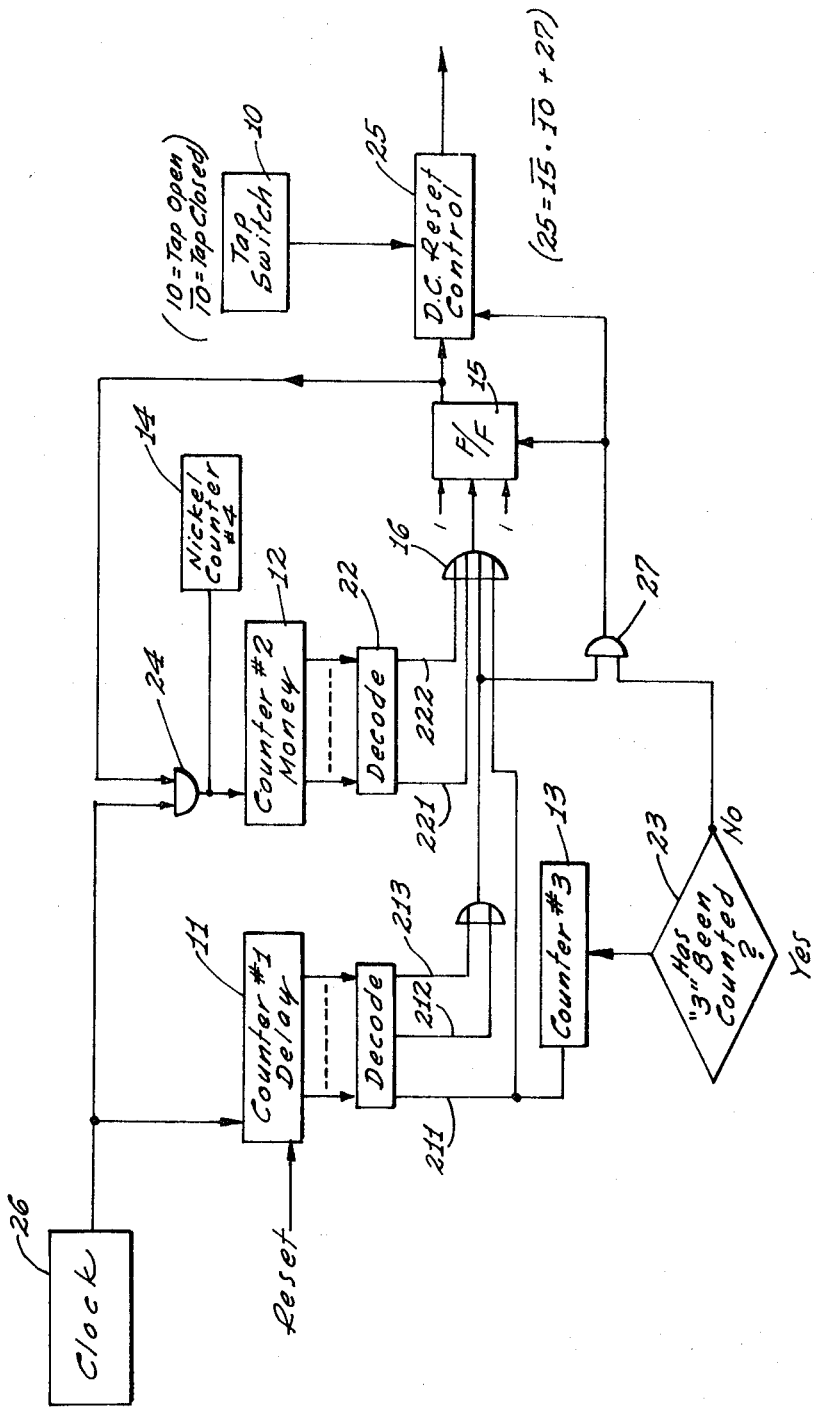

APPARATUS FOR MONITORING DISPENSION OF LIQUID

The present invention relates to the supervision of liquid dispensing and to the metering and tallying of the monetary equivalent of such dispensing.

Supervision of such type is particularly needed in taverns where kegged beer or other beverage is dispensed from taps. An accurate tally is needed here to prevent dispensing without collection of money for the benefit of the owner. Clearly, just tallying the number of tap openings and closing is is insufficient for even, modest supervision. Therefor, it is necessary to meter the flow of liquid through the open tap in a manner that the rate of flow can be correlated with tallying of selected monetary units (e.g. nickels), so as to arrive at the proper price after the corresponding quantity has been dispensed. Conventionally, this is being done by selecting a count rate that is the approximate equivalent flow rate of liquid. In other words, each counting and tallying step period equals the period of time it takes to dispense a "unit quantity" of liquid, the price of which is, e.g., a nickel. Such an operation presupposes that the rate of flow is constant and uniform on a long term basis. This assumption is, however, not correct. The pressure in the keg varies to a considerable extent, and the formation of head may require several tap openings. Also, the tap may not be open completely each time liquid is dispensed. An additional difficulty arises from common practice to distinguish glass and pitcher price (i.e. a quantity discount). This is a particular source for cheating as fanning (leaving the tap open while dispensing several glasses) may be difficult to distinguish from filling a pitcher.

The apparatus in accordance with the invention solves the problem as posed by using the principle of alternating between metering of tolerance delays and fast money unit counts, using a count rate that is definitely in excess of the equivalent flow rate (twice or more). The basic supervision cycle is composed of, at first, tolerance and delay period permitting small quantities of liquid to be dispensed without money tally (completion of fill), a second period of fast counting, for example, up to a "glass price, " and a third period during which the dispensing of liquid for a glass must be completed; (if the liquid is not a beverage the operation is analogous; it is just convenient to describe the invention in terms of "glass" and "pitcher"). If dispensing was not terminated during that period, operation recycles. In case of pitcher dispensing, it is practical to provide for as many "glass" cycles as highest glass price multiple under the pitcher price. The price differential, as well as a pressure variation delay period are metered, i.e., counted out, during two subsequent, additional, sequential periods.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates a block diagram for a supervising and money tallying apparatus in accordance with the preferred embodiment of the invention.

Proceeding to the detailed description of the drawing, there are illustrated the following basic components, interconnected in a particular manner. There is a tap switch 10 connected physically to a tap (not shown) for dispensing beverage, for example, beer. The switch may simply be connected to the handle of such a tap, or it may be connected to the conduit between tap proper and storage facility (keg etc.) A switch of that type is disclosed, for example, in U.S. Pat. No. 3,423,551. For the following, it is merely significant, that switch 10 provides a switch closed signal like designation in representation of an open tap (beer is being disposed) and a switch open signal $\overline{10}$, when the tap is closed.

The tap switch provides the principle input for the circuitry illustrated which includes a principal delay counter No. 1 (box 11), a money counter No. 2 (box 12), a glass counter No. 3 (box 14). These counters are under operating control of a flip-flop 15, a reset control circuit 25, a clock gate 24 a 10 Hz clock 26, and decode circuits 21, 22, 23. Counters No. 1, 2 and 3 are regular electronic counters, preferably of the binary variety, composed of, for example, $j$-$k$ flip-flops of the type that can be DC-reset through an unclocked, erase input. The counter stages are clocked for counter advance in response to clock pulses furnished by clock 26; gating structure interconnects output $s$ and $J$, $k$ inputs of these stages. This is conventional and does not require elaboration.

The nickel counter No. 4 (box 14) may be a high speed, mechanical counter with digit wheels and appropriate indication to count money in units of nickels. There is no particular requirement to count in units of nickels, but for beer that is the usual unit by which prices differ (at the present time). Any other unit can be chosen. Nickel counter No. 4 will not be reset during operation, but is a cumulator, tally counter.

The decoders 21 and 22 are gates connected respectively to the stages of counters 11 and 12 to respond to particular count states. As to counter No. 1, the count decode states are, a minimum count (line 211), a period corresponding to a maximum period of time it takes to draw a glass of beer (line 212), and a particular period needed to provide representation of the maximum period of time it takes to draw a pitcher (line 213). As to counter No. 2 and decoder 22, the count decode states are, a count state equivalent to the price of a glass of beer (line 221) and a count state equivalent of the price of a pitcher (line 222). Each of the periods as metered by price counter No. 2 terminates considerably before the respective quantity has, in fact, been dispensed.

The decoder 22 for the money counter should be readily adjustable, to vary the prices. There may be a switching matrix interposed which, in effect, permits establishing a different connection as between decoder gates and counter No. 2. Alternatively, the decoder 22 may have many different output terminals and each output line 221, 222 can be connected to different decoder outputs proper. The decoder 23 is actually a decision making gate-latch structure determining whether or not glass counter No. 3 has reached a particular count state representative of a money count for three or more glasses. An output gate 27 responds particularly as long as that glass count-three state has not been reached. The flip-flop 15 is a $j$-$k$ flip-flop operated as toggle flip-flop in that its $j$-$k$ inputs are set true permanently (denoted as $j = k = 1$), and the operating toggle input is provided by "OR" gate 16 connected to the clock input of the flip-flop. Additionally, flip-flop can be DC reset and clamped to the reset state.

The dc reset control circuit 25 is a plurality of gates to provide a true output for particular logic states of several elements in the circuit, as represented by the depicted logic equation $25 = \overline{15} \cdot \overline{10} + 27$. Signal 25, when true, resets counters 1 and 2 and clamps them to count state "0." A signal $\overline{25}$, thus, permits counter operation. Details of counter resetting will be developed next upon describing overall operation. The operation will be described with reference to a sequence of operational phases, as they will or may occur during dispensing of a glass of beer, of several glasses or of a pitcher (or of several pitchers).

As long as beverage is not dispensed, circuit 25 provides a reset clamp to all electronic circuitry, causing counters No. 1, 2 and 3 to remain in count state zero. Flip-flop 15 is in the reset state, and nickel counter No. 4 retains its previously tally count.

As the tap is opened, the reset clamp of the counters is removed ($25 \rightarrow \overline{25}$), but flip-flop 15 stays reset so that delay counter No. 1 is enabled and begins to count clock pulses up to a minimum period of, say ½ seconds (5 pulses of the 10 Hz clock). This period serves to permit brief openings of the tap without causing any "money count" to respond, to permit complete filling of a previously filled glass in which too much head developed during the regular fill. Thus, if during this minimum delay period the tap is closed, reset conditions are merely restored; money has not been counted, because gate 24 remains blocked to inhibit counting by counters No. 2 and 4.

After the minimum delay of "money counting tolerance" has elapsed, without the tap having been closed, decoder 21 responds again and a signal in line 211 toggles flip-flop 15 to the set state. Additionally, the glass counter No. 3 is advanced to count state 1. The period now following is precisely metered and represents money count. On basis of the fairly high clock pulse rate, it can be seen that, for example, the price of 40 cts. is metered after counting eight nickels in 8/10 secs., or less than 1½ secs. from the beginning of tap opening. Thus, price counting for a glass of beer is completed quite early, long before completion of regular dispensing! Nickel counter No. 4 advances concurrently with the money counter No. 2.

It is an important aspect that during that period, tap opening and closing has no effect on the counter operation. Thus, a glass price count will be completed independently from tap actuation. However, the circuit could be provided with an additional gate on the output of clock 26, receiving the tap switch state signal directly for gating, so that upon tap closing prior to glass price count completion, counting is merely stopped and resumed upon reopening of the tap!

In any event, tap closing in that period does not reset anything. After the particularly encoded glass price has been counted, decoder 22 responds and provides a signal to line 221, toggling flip-flop 15, i.e., resetting it. The resetting of flip-flop 15 re-enables reset control 25 to become responsive to tap closing, for causing everything (except counter No. 4) to reset. However, in the period following glass price completion, gate 24 remains closed so that further price units are not accumulated in counters No. 2 and 4. Of course, as long as the tap is open, delay counter No. 1 continues to run.

The particular delay period provided for after completion of the money count is selected primarily to offset pressure variations. It is not possible to define precisely the period it takes to draw a glass of beer except that a reasonable maximum period can be determined empirically having validity particularly under low pressure conditions. That period is again metered by counter No. 1. In case the tap is closed at some time within that period, counters NO. 1, 2 and 3 reset. If, however, the tap is not closed during this period, and the "maximum glass time" is counted out by counter No. 1, (counter No. 2 has stopped on 15 → $\overline{15}$), decoder 21 provides a signal to line 212 to toggle flip-flop 15 back to the set state, as an indication that dispensing of beer continues. Gate 27 responds also to the maximum glass time decode signal forcing circuit 25 into the reset condition so that all counters (except No. 4) are reset. Additionally, the signal 27 serves also as dc reset signal, for flip-flop 15 to pull the flip-flop 15 back immediately to the reset state. As counter No. 1 and 2 reset, the signal 27 turns false again so that the reset signal 25 is removed, and counting can resume. This is the particular recycling control of the inventive apparatus.

As a consequence of these operations, counters No. 1 and 2 are reset upon maximum glass time. With the tap continuing to be open, the operations continue, just as if the tap has been opened. The minimum delay period is counted out (which is in consequential except that it operates as an extension of the maximum permissible draw time. This period is, however, brief. At the end of that delay, glass counter No. 3 is incremented (now to count state 2). There follows the counting operation involving counters No. 2 and 4 and that, in turn, is followed by the pressure tolerance period, as metered by delay counter No. 1 until maximum glass count has been reached.

Assuming that drawing of beer continues, on the third cycle glass counter No. 3 is placed in count state 3. Thus, as maximum glass time is reached for the third time, decision gate 23 holds gate 27 to the false state, so that flip-flop 15 remains set after toggling to the set state by the maximum glass time decode signal in line 212. Reset control 25 is not triggered, if the tap is still open on $\overline{15}$ → 15. Thus, not only is counter No. 1 not stopped, but counter No. 2 continues from the glass price count up, and counter No. 4 tallies nickels concurrently. This particular counting continues until counter No. 2 has reached a nickel count which, taken together with the previous two glass price counts, equals a pitcher price count.

The following should be interjected here. The pitcher price is usually a discount price as to the particular quantity of beer. The time it takes to draw that quantity is equivalent to a number of glasses of beer, the number being higher than the ratio of pitcher to glass price. On the other hand, a bartender could readily cheat during so-called fanning, keeping the tap open while filling a number of glasses in immediate sequence, collecting multiple glass price while only pitcher price is registered. However, there is a practical limit as to fanning which per se should be permitted. Therefore, the number of glass count cycles of the operation is selected to equal that practical limit (3 glasses). The limit can actually be set as the next lower glass price multiple below the pitcher price. As the pitcher is usually equivalent to a considerable number of glasses, undue fanning is, in fact, curtailed.

During that period between the last "maximum glass time" and the "pitcher price count completed," flip-flop 15 stays set, thus, inhibiting reset device 25. After the pitcher price differential has been counted in counter No. 2, and total pitcher price has been tallied in counter No. 4, decoder 22 responds (signal in line 222), and flip-flop 15 resets again. The following period serves again for compensation of pressure variations. Money counters No. 2 and 4 have stopped as gate 24 is blocked again, but counter No. 1 continues to meter this pressure compensation period. During this period tap 10 can be closed and everything will be reset (except, of course, nickel tallying counter No. 4). Should counter No. 1 be permitted to run for that period without tap closing, decoder 21 responds and sets a signal into line 213 which has the same effect as a signal in line 212. Everything is reset but resetting is only temporary as the entire cycle will begin anew.

The invention is not limited to the embodiments described above but all changes and modifications thereof not constituting departures from the spirit and scope of the invention are intended to be included.

I claim:

1. Apparatus for metering the equivalent monetary value of a quantity of liquid dispensed by means of a tap, and having a switch the states of which representing tap opening and closing, comprising:

first means providing clock pulses at a particular rate;
   second means connected for counting clock pulses in response to a tap open switch state, and providing first, second and third count state signals respectively in representation of the end of a first metered delay period of time, the end of a second period of time corresponding to counting the monetary equivalent value of a particular quantity of liquid that has not completely flow through the open tap by the time of the second count state signal, and the end of a third period of time prior to which the quantity has been dispensed;
   third means connected to the second means and responsive to a tap closing switch state when occuring prior to the first or subsequent to the second but prior to the third count state signals, for resetting and disabling the second means until the next tap open switch state, further responsive to the third count state signal for resetting the second means to continue counting and providing of the count state signals on a repetitive basis; and
   fourth means connected to operate in parallel to the second means for cumulatively tallying clock pulses in between the first and second count states.

2. Apparatus as in claim 1, including fifth means connected to count operating cycles of the second and third means upon uninterrupted tap opening, and operating the second means after counting a predetermined number of cycles, and inhibiting the resetting of the second means for obtaining additional, fourth and fifth count state signals by the second means respectively (a) in representation of counting the monetary equivalent of a second particular quantity of liquid that has not completely flown through the open tap by the time of the fourth count state signal, and (b) in representation of counting to the end of a period prior to which the second particular quantity has been dispensed;

sixth means included in the third means for causing the fourth means to operate up to the fourth count state signal, resetting and disabling the second and fifth means when the tap closed switch state occurs prior to the fifth count state signal;

seventh means included in the third means for resetting the second and fifth means for continued counting operation in response to occurrence of the fifth count state signal.

3. Apparatus for metering the equivalent monetary value of a quantity of liquid dispensed by means of a tap, and having a switch the states of which representing tap opening and closing, comprising:

first means providing clock signals in representation of monetary units, at a rate higher than the monetary equivalent rate of flow of liquid through the tap when open;

second means including first resettable counter means connected to the first means and enabled upon a first switch state representing a tap opening, for counting the clock pulses;

third means including a first decoder connected to the first counter means, for disabling the first counter means in response to a first count state by the first counter means;

fourth means including second resettable counter means connected to the first means and enabled in response to the first switch state;

fifth means including a second decoder connected to the second counter means for responding to a second count state that occurs later than the first count state as monitored by the first decoder, the fifth means connected to reset the first and second counter means upon change in switch state corresponding to a tap closing prior to reaching of the second count state the fifth means recycling the first and second counter means through count state zero and causing the first and second counter means to resume counting upon persistence of the first switch state up to the second count state; and an accumulating, tally counter connected to operate in parallel to the first counter means.

4. Apparatus as in claim 3, including a third resettable counter connected to count cycles of operation of the second through fifth means and overriding the setting as controlled by the fifth means upon persistence of the first switch state so that the first and second counter means continue to count, for the tally counter to be incremented by an additional particular amount and for the second decoder to provide an additional count state signal operating parallel to the second count state signal, the fifth means connected to obtain resetting of the first, second and third counter means upon change in switch state corresponding to a tap closing prior to providing of the additional count state signal by the second decoder.

5. Apparatus for metering the equivalent monetary value of a quantity of liquid dispensed by means of a tap and having a switch, the states of which representing tap opening and closing, comprising:

first means providing clock pulses at a particular rate;

second means connected for counting clock pulses in response to a tap open switch state and providing a particular signal beginning subsequent to tap opening and ending after a variable period for dispensing a particular quantity of liquid has elapsed;

Third means responsive to occurrence of a tap closing switch state during providing of the particular signal for resetting and disabling the second means, thereby prematurely terminating the particular signal;

fourth means connected to be responsive to ending of the particular signal without prior occurrence of the tap closing switch state, for recycling the second means; and;

a tally counter connected for counting clock pulses, the tally counter discontinuing tallying upon occurrence of the particular signal, for tallying monetary value of a particular quantity of liquid that has not been dispensed completely at the beginning of the particular signal, tallying being considerably faster than the equivalent monetary flow rate of the liquid through the open tap.

* * * * *